United States Patent [19]

Fujimoto

[11] Patent Number: 5,402,172
[45] Date of Patent: Mar. 28, 1995

[54] IMAGE SIGNAL PROCESSING DEVICE HAVING PHASE REFERENCE SIGNAL ADDING FUNCTION

[75] Inventor: Ryo Fujimoto, Kanagawa, Japan

[73] Assignee: Canon Kabushiki Kaisha, Tokyo, Japan

[21] Appl. No.: 247,473

[22] Filed: May 23, 1994

Related U.S. Application Data

[63] Continuation of Ser. No. 143,989, Oct. 27, 1993, abandoned, which is a continuation of Ser. No. 784,756, Oct. 30, 1991, abandoned.

[30] Foreign Application Priority Data

Nov. 5, 1990 [JP] Japan ................................ 2-297077

[51] Int. Cl.⁶ ............................................. H04N 5/067
[52] U.S. Cl. .................................. 348/232; 348/183; 348/522
[58] Field of Search ................ 348/183, 232, 522, 443, 348/444; 358/151; H04N 5/067

[56] References Cited

U.S. PATENT DOCUMENTS 4,054,904 10/1977 Saitoh et al. ............................ 358/22
4,914,519 4/1990 Hashimoto et al. ............. 358/213.18
5,047,975 9/1991 Kozuki et al. ........................ 358/342

FOREIGN PATENT DOCUMENTS 58-39178 3/1983 Japan ............................... H04N 7/00

OTHER PUBLICATIONS

High Resolution NTSC television system—vol. 21 No. 5 Oct. 1978.

*Primary Examiner*—James J. Groody
*Assistant Examiner*—Cheryl Cohen
*Attorney, Agent, or Firm*—Robin, Blecker, Daley & Driscoll

[57] ABSTRACT

An image signal processing device for processing an image signal is arranged to temporarily store the image signal inputted and a reference signal generated, and, after that, to read out the signals stored. This arrangement enables the signal processing device to accurately add the reference signal to the image signal without deteriorating the reference signal.

14 Claims, 1 Drawing Sheet

| 0 | 0 | 255 | 255 | 0 | 0 | 0 | 0 | 0 | 0 | 0 |
|---|---|---|---|---|---|---|---|---|---|---|
| 0 | 0 | 255 | 255 | 0 | 0 | 0 | 0 | 0 | 0 | 0 |
| 0 | 0 | 255 | 255 | 0 | 0 | 0 | 0 | 0 | 0 | 0 |
| 0 | 0 | 255 | 255 | 0 | 0 | 0 | 0 | 0 | 0 | 0 |
| 0 | 0 | 255 | 255 | 0 | 0 | 0 | 0 | 0 | 0 | 0 |
| 0 | 0 | 255 | 255 | 0 | 0 | 0 | 0 | 0 | 0 | 0 |
| 0 | 0 | 255 | 255 | 0 | 0 | 0 | 0 | 0 | 0 | 0 |

IMAGE SIGNAL

IMAGE SIGNAL PROCESSING DEVICE HAVING PHASE REFERENCE SIGNAL ADDING FUNCTION

This is a continuation application under 37 CFR 1.62 of prior application Ser. No. 08/143,989, filed Oct. 27, 1993, (now abandoned), which is a continuation of Ser. No. 07/784,756, filed Oct. 30, 1991, (now abandoned).

BACKGROUND OF THE INVENTION

1. Field of the Invention

This invention relates to an image signal processing device arranged to process an image signal.

2. Description of the Related Art

A camera of the kind using a video floppy disc is known by the name of a still video camera (hereinafter referred to as an SV camera). The SV camera is arranged to magnetically record a still image on a video floppy disc in accordance with a current TV system such as the NTSC or the PAL system. However, a level attainable in accordance with the NTSC system hardly permits the obtaining of an image with an adequate picture quality by printing the image which is magnetically recorded on the floppy disc.

To solve this problem, an SV camera called a compatible high-definition SV (hereinafter referred to as CHSV) camera has been proposed.

The CHSV camera is arranged as follows. Two frame amounts of an image signal formed in accordance with, for example, the NTSC system (or the PAL or SECAM system or any other current TV system) are arranged in an offset state. The two frame amounts of image signal are recorded in four tracks. At the time of reproduction, the recorded image signal is first sampled. The sampled signal is temporarily stored in a memory. Then, an amount of information which is four times as much as an amount obtainable in accordance with the NTSC system can be equivalently reproduced by interpolating the recorded image signal with image information which is not recorded on the video floppy disc by means of an interpolation filter or the like.

In the CHSV camera, as is apparent from the above description, the sample value of the image signal obtained at the time of recording must be accurately restored at the time of reproduction. For this purpose, a method called a "sample-value analog transmission" method is employed. This method must be carried out to satisfy the condition of having no interference between codes according to the Nyquist theorem.

Further, the phase of resampling to be made at the time of reproduction must be accurately adjusted to the phase of the image signal. This requirement is met by means of a high-precision time base corrector (TBC) with some phase reference. As to the sample-value analog transmission, a multiple sub-Nyquist sub-sampling encoding (MUSE) method is employed. The details of the method are as described in the literature relative thereto and are therefore omitted here.

In the CHSV camera, a phase reference pulse signal called an HIT (horizontal interval test) pulse signal is employed. The HIT pulse signal, the pulse width of which corresponds to the sampling period of the image signal, is added to the image signal in a position located at the left end of the image plane. The position (phase) of the peak value of the HIT pulse signal is used as the phase reference. It has been practiced to generate the HIT pulse signal by a pulse generator and to add the HIT pulse signal in a state of an analog signal to the image signal which is outputted from an image sensor.

The HIT pulse signal is added in the state of an analog signal at an extremely high speed. Therefore, the adding process causes not only an increase in power consumption but also overshooting, undershooting or the like in the waveform of the HIT pulse signal. After the occurrence of such overshooting or undershooting, the waveform of the HIT pulse signal tends to be distorted when it passes through a low-pass filter (LPF). In such a case, the position (phase) of the HIT pulse waveform comes to deviate from the phase of the image signal. The use of the HIT pulse signal which is added in such a distorted state as a phase reference signal detracts from correct reproduction of the image signal, because accurate reproduction of the sample value is prevented by the phase deviation of resampling.

SUMMARY OF THE INVENTION

It is a general object of this invention to provide an image signal processing device which is capable of solving the problem mentioned in the foregoing.

It is a more specific object of the invention to provide an image signal processing device which is capable of accurately adding a reference signal to an image signal without deteriorating the reference signal.

To attain this object, an image signal processing device which is arranged as an embodiment of this invention to process an image signal comprises image signal input means for inputting an image signal; reference signal generating means for generating a reference signal; and temporary storage means arranged to temporarily store the image signal inputted from the image signal input means and the reference signal generated by the reference signal generating means and, after that, to read out the stored image signal and the stored reference signal.

It is another object of the invention to provide an image signal processing device which is capable of accurately and stably adding a phase reference signal to an image signal corresponding to an image of an object and to record these signals on a recording medium.

Under that object, an image signal processing device which is arranged as another embodiment of this invention to process an image signal comprises image signal generating means arranged to sense an image of an object and to generate an image signal corresponding to the sensed image of the object and including a synchronizing signal; phase reference signal generating means for generating a phase reference signal different from the synchronizing signal; memory means arranged to store the image signal generated by the image signal generating means and the phase reference signal generated by the phase reference signal generating means and, after that, to read out the stored image signal and the stored phase reference signal; and recording means for recording the signals read out from the memory means on a recording medium.

These and other objects and features of this invention will become apparent from the following detailed description of an embodiment thereof taken in connection with the accompanying drawings.

DETAILED DESCRIPTION OF THE PREFERRED EMBODIMENT

Figures 1, 2:
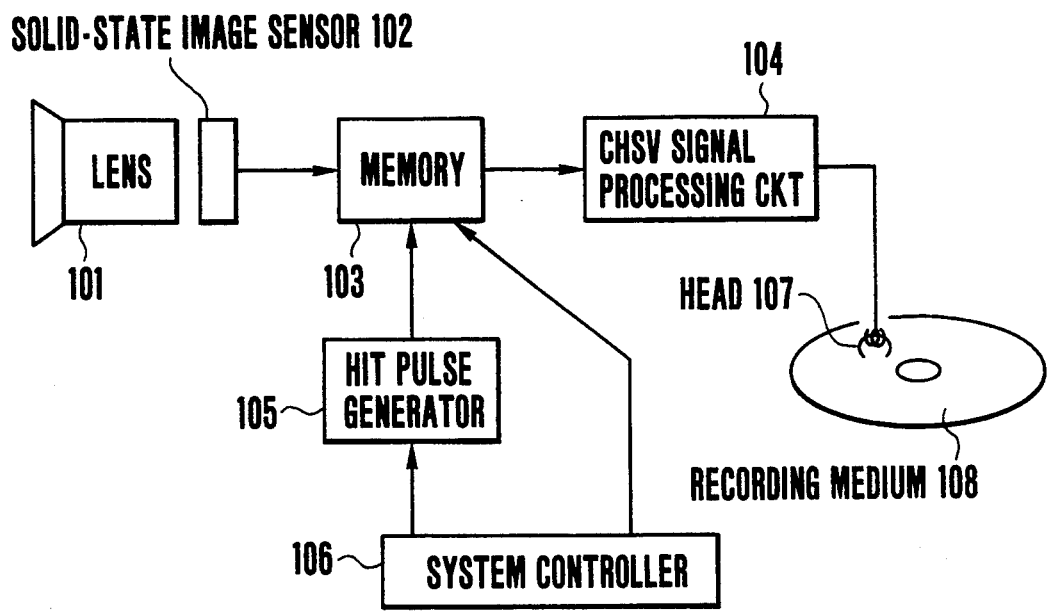
FIG. 1 is a block diagram showing in outline the arrangement of an image sensing and recording device which is arranged as an embodiment of this invention.
FIG. 2 shows the arrangement of an IC memory 103 shown in FIG. 1.

The following describes the details of this invention through an embodiment thereof.

FIG. 1 shows in outline the arrangement of an image sensing and recording device which are an embodiment of the invention. Referring to FIG. 1, when a shutter release button which is not shown is depressed, a first release switch is closed. With the first release switch closed, a system controller 106 comes to perform a control operation. Under the control of the system controller 106, HIT pulse data which indicates HIT pulses is generated by an HIT pulse generator 105 in the form of a digital signal. The HIT pulse data are written in a given part of an IC memory 103. When a second release switch is closed after the first release switch, a solid-state image sensor 102 is exposed for a given period of time. As a result, an optical image is formed on the solid-state image sensor 102 through a lens 101. The image sensor 102 then photoelectrically converts the optical image. The conversion output of the image sensor 102 thus obtained is supplied to an A/D (analog-to-digital) converter which is not shown. The A/D converter A/D converts the output of the image sensor 102. The output of the A/D converter is then written also into the IC memory 103 in a given part other than the part in which the HIT pulse data are written.

Data writing and reading actions on the IC memory 103 are performed under the control of an accurate and constant clock signal supplied from the system controller 106. Therefore, the position (phase) of the HIT pulse signal relative to the image signal remains unchanged by the data writing and reading actions on the IC memory 103.

FIG. 2 shows the state of writing data into the IC memory 103. Referring to FIG. 2, the IC memory 103 is arranged to have the HIT pulses which are data indicated by numeral "255" added to a part near the left end of an image plane.

The data which are temporarily stored by the IC memory 103 in the above-stated manner is read out from the IC memory 103 by the system controller 106. The data thus read out are D/A (digital-to-analog) converted by a D/A converter which is not shown. An analog signal which is thus obtained is supplied via a CHSV signal processing circuit 104 to a head 107 to be recorded on a recording medium 108 which is a video floppy disc. The signal is recorded in a frequency-modulated state.

Further, the data stored in the above-stated IC memory 103 are arranged to be continuously read out including the HIT pulse data in accordance with accurate and constant clock pulses. Therefore, the HIT pulse signal is added in a correct position relative to the image signal. The image data which are read out from the IC memory 103 with the HIT pulse data added thereto are D/A converted. However, since the HIT pulse data are added in a correct position relative to the image data in the state of a digital signal, the D/A conversion can be carried out without consuming much power. Even if the waveform of the HIT pulses is distorted by the subsequent sample-value analog transmission, the signal reproduced from the recording medium 108 can be resampled with the phase of resampling accurately adjusted to the phase of sampling made at the time of recording. Therefore, the sample-value analog transmission can be correctly accomplished. In the case of an analog recording and reproducing system using a video floppy disc in an analog transmission path like this embodiment, fluctuations in time base occurring on the transmission path might cause some discrepancy between the phase of sampling made at the time of recording and the phase of resampling made at the time of reproduction. Therefore, the method of adding the HIT pulse signal as a phase reference signal in the manner described above is advantageous.

Further, the embodiment is arranged to process the CHSV signal in the form of an analog signal. However, this arrangement may be changed to process the CHSV signal in the form of a digital signal by using the data read out from the IC memory 103 and, after that, to convert the CHSV signal into an analog signal before recording on the recording medium 108.

In the foregoing, the embodiment has been described as a CHSV system arranged to record and reproduce a black-and-white image signal. However, in accordance with this invention, a color image signal also can be processed in a similar manner. In the case of a color image signal, the phase reference pulse signal is added to a color information signal. While the embodiment described is arranged to add the HIT pulse signal for every horizontal line as a phase reference signal, this invention is not limited to this arrangement and the arrangement may be variously changed. For example, several HIT pulses may be added to the image signal per image plane. The waveform of the HIT pulse signal to be added may be arranged to be of a three-valued waveform. Various changes and modifications thus may be made without departing from the spirit and scope of the invention.

Further, it goes without saying that this invention is applicable not only to the CHSV recording and reproducing system but also to any other systems that are arranged to employ the sample-value analog transmission.

As described in the foregoing, in accordance with this invention, the phase reference pulses can be added to the image signal in an accurate position (phase) relative to the image signal, so that accurate sample values can be restored by resampling.

What is claimed is:

1. An image signal processing device for processing an image signal, comprising:
   a) image signal forming means for forming an image signal;
   b) conversion means for inputting the image signal outputted by said image signal forming means, and generating a converted image signal;
   c) information signal generating means for generating an information signal which is different from a synchronizing signal and which is used at time of restoring an original image signal from the converted image signal; and
   d) temporary storage means arranged to temporarily store the converted image signal outputted by said converting means and the information signal generated by said information signal generating means, in separate storage areas, respectively, and then to read out the stored converted image signal and the stored information signal at different timings, respectively.

2. A device to claim 1, wherein said temporary storage means is arranged to store the information signal generated by said information signal generating means and then store the converted image signal outputted from said converting means.

3. A device according to claim 1, wherein said temporary storage means includes a memory and a memory control circuit which is arranged to control signal storing and reading operations on said memory.

4. An image signal processing device for processing an image signal, comprising:
   a) image signal input means for inputting an image signal including a synchronizing signal;
   b) phase reference signal generating means for generating a phase reference signal different from said synchronizing signal;
   c) a memory arranged to temporarily store the image signal inputted from said image signal input means and the phase reference signal generated by said phase reference signal generating means and to then read out the stored image signal and the stored reference signal; and
   d) a memory control circuit arranged to cause the image signal inputted from said image signal input means and the phase reference signal generated by said phase reference signal generating means to be stored in respective separate storage areas provided on said memory and to serially read out the stored signals from said memory in a predetermined sequence.

5. A device according to claim 1, wherein said information signal includes a phase reference signal which indicates a reference phase for the sampling image signal.

6. A device according to claim 1, wherein said sampling image signal processing device further comprises transmission means for transmitting signals read out from said temporary storage means.

7. A device according to claim 6, wherein said transmission means includes a recording apparatus for recording on a recording medium the signals read out from said temporary storage means.

8. A sampling image signal processing device for processing a sampling image signal, comprising:
   a) sampling image signal generating means arranged to sense an image of an object to be photographed and to generate a sampling image signal corresponding to the sensed image of the object;
   b) information signal generating means for generating an information signal which is different from a synchronizing signal and which is used at the time of restoring an original image signal from said sampling image signal;
   c) memory means arranged to temporarily store the sampling image signal generated by said sampling image signal generating means and the information signal generated by said information signal generating means in separate storage areas, respectively, and to then read out the stored sampling image signal and stored information signal at different timings, respectively; and
   d) recording means for recording the signals read out from said memory means on a recording medium.

9. A device according to claim 8, wherein said memory means is arranged to store the information signal generated by said information signal generating means and then store the sampling image signal generated by said sampling signal image generating means.

10. A device according to claim 8, wherein said memory means includes a memory circuit and a memory control circuit which is arranged to control signal storing and reading operations on said memory circuit.

11. An image signal processing device for processing an image signal, comprising:
   a) image signal generating means arranged to sense an image of an object to be photographed and to generate an image signal corresponding to the sensed image of the object and including a synchronizing signal;
   b) phase reference signal generating means for generating a phase reference signal different from the synchronizing signal;
   c) a memory circuit arranged to store the image signal generated by said image signal generating means and the phase reference signal generated by said phase reference signal generating means and then to read out the stored image signal and the stored phase reference signal;
   d) a memory control circuit for controlling storing and reading out of signals on or from said memory circuit to cause the image signal generated by said image signal generating means and the phase reference signal generated by said phase reference signal generating means to be stored in respective separate storage areas provided on said memory circuit and to serially read out the stored signals from said memory circuit in a predetermined sequence; and
   e) recording means for recording the signals read out from said memory means on a recording medium.

12. A device according to claim 8, wherein said information signal includes a phase reference signal indicating a reference of phase of the sampling image signal.

13. A device according to claim 1, wherein said image signal forming means is arranged to sense an image of an object to be photographed and to generate the image signal corresponding to the sensed image of the object.

14. A device according to claim 1, further comprising recording means for recording the signals read out from said temporary storage means.

* * * * *